United States Patent
Takahashi

(10) Patent No.: US 10,419,679 B2
(45) Date of Patent: Sep. 17, 2019

(54) IMAGE PICKUP APPARATUS, CONTROL METHOD, AND STORAGE MEDIUM

(71) Applicant: CANON KABUSHIKI KAISHA, Tokyo (JP)

(72) Inventor: Tomoaki Takahashi, Sagamihara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/878,306

(22) Filed: Jan. 23, 2018

(65) Prior Publication Data

US 2018/0227496 A1 Aug. 9, 2018

(30) Foreign Application Priority Data

Feb. 3, 2017 (JP) ................. 2017-019037

(51) Int. Cl.
*H04N 5/232* (2006.01)
*H04N 5/225* (2006.01)

(52) U.S. Cl.
CPC ..... *H04N 5/23293* (2013.01); *H04N 5/22525* (2018.08); *H04N 5/23219* (2013.01); *H04N 5/23245* (2013.01)

(58) Field of Classification Search
None
See application file for complete search history.

(56) References Cited

U.S. PATENT DOCUMENTS

2016/0330381 A1* 11/2016 Kusaka .............. H04N 1/00281

FOREIGN PATENT DOCUMENTS

JP 2012-129670 A 7/2012

* cited by examiner

*Primary Examiner* — Mark T Monk
(74) *Attorney, Agent, or Firm* — Canon USA, Inc., IP Division

(57) ABSTRACT

An image pickup apparatus includes a finder unit configured to enable visual confirmation of an object image; a display unit located outside of the finder unit; and a control unit configured to control a display time for a first image acquired in a first shooting operation to be longer than a display time for a second image acquired in a second shooting operation in a case where a plurality of images is sequentially displayed on the display unit as a review display after continuous shooting is performed, the plurality of images being captured in the continuous shooting for continuously performing a plurality of shooting operations including at least the first shooting operation and the second shooting operation in response to a shooting instruction, the second shooting operation being performed after the first shooting operation.

20 Claims, 8 Drawing Sheets

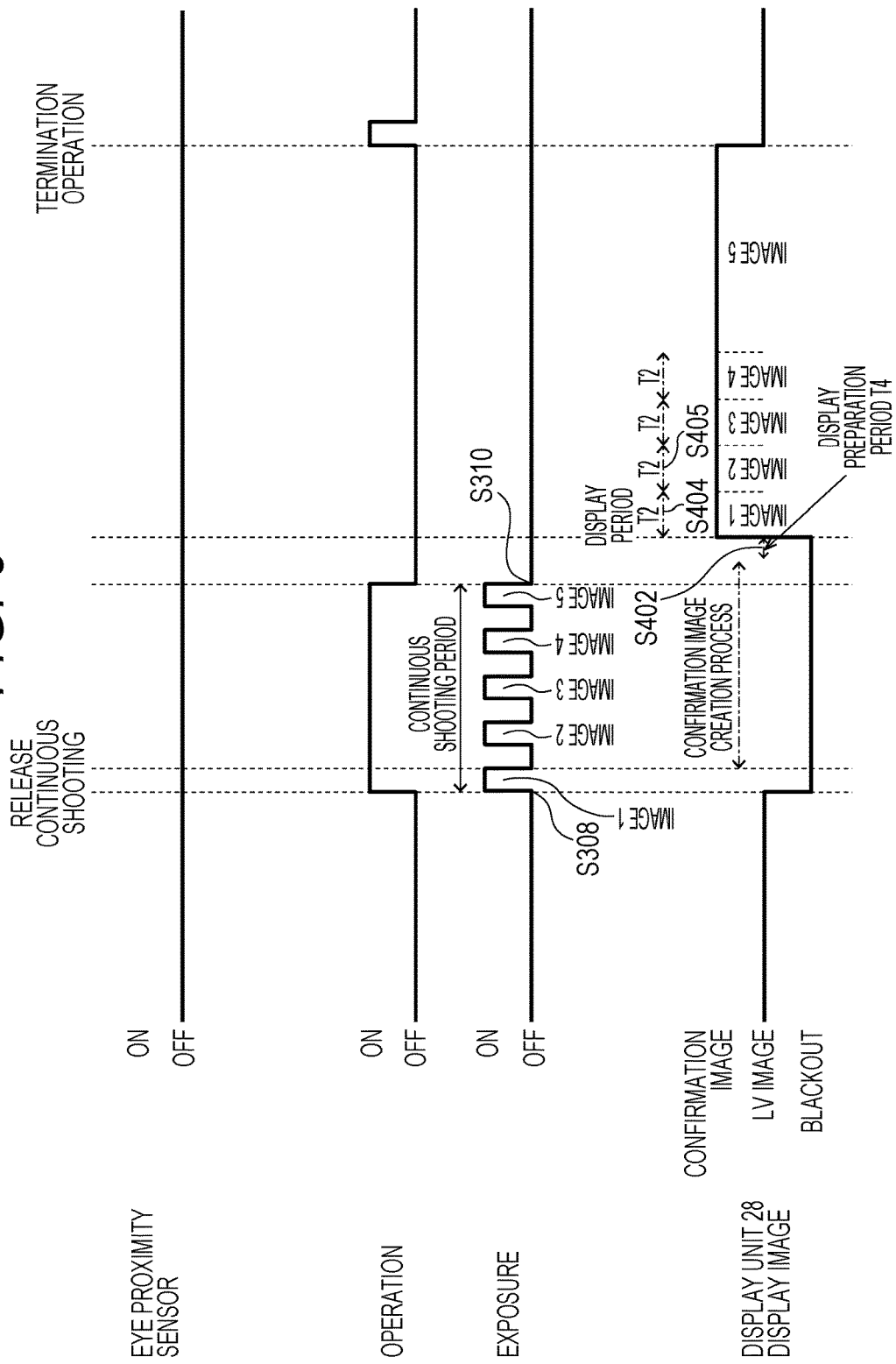

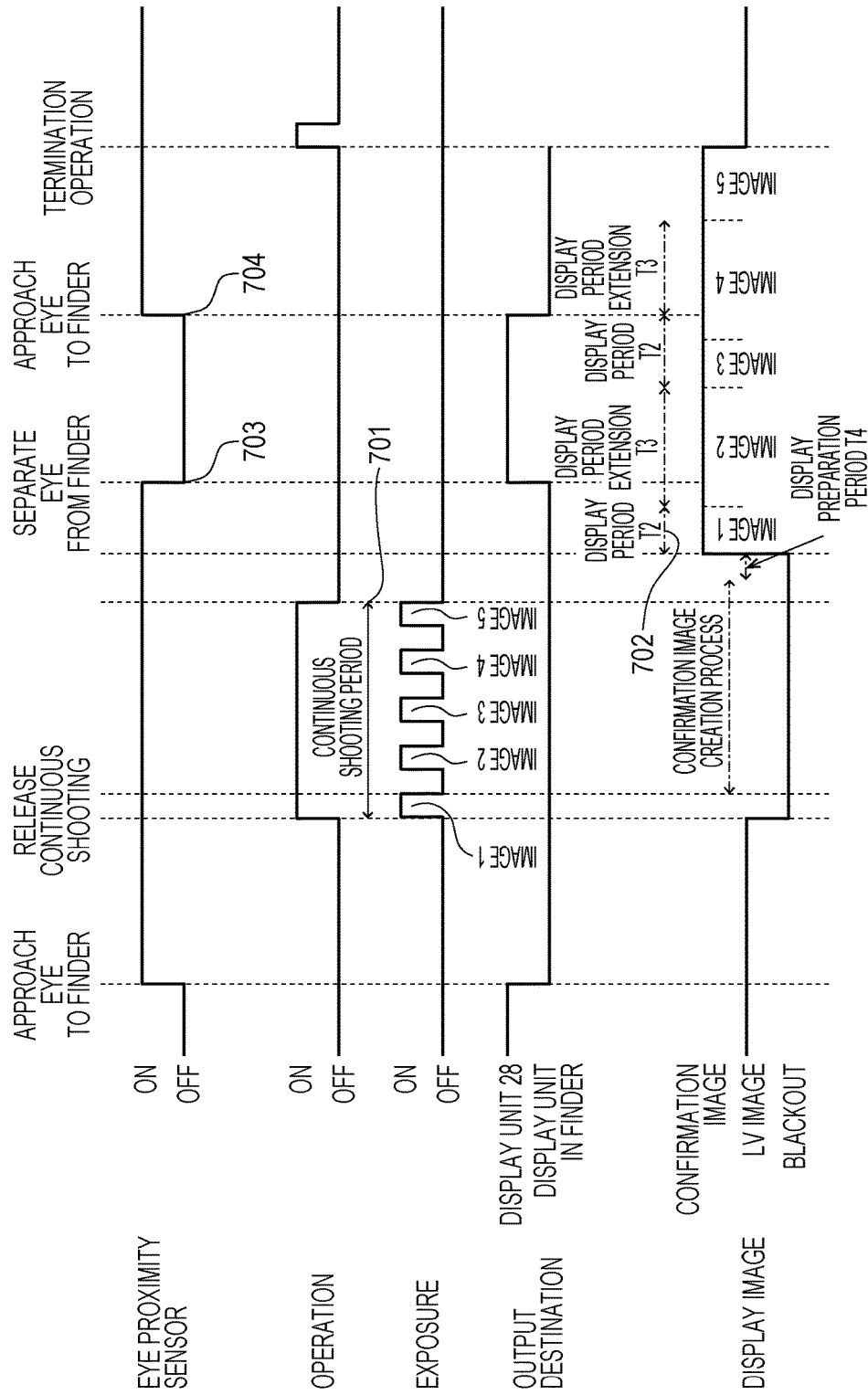

IMAGE PICKUP APPARATUS, CONTROL METHOD, AND STORAGE MEDIUM

BACKGROUND

Field of the Disclosure

The present disclosure generally relates to imaging and, more particularly, to an image pickup apparatus, a control method, and a storage medium, and more particularly, to a technique for displaying an image for confirmation after continuous shooting is performed.

Description of the Related Art

Continuous shooting for continuously capturing a plurality of images is known. Japanese Patent Laid-Open No. 2012-129670 discloses a method in which images are displayed on a display unit located on a rear surface of a camera in the order in which the images are captured when user's eyes approaching an eye proximity unit are not detected after continuous shooting is performed in a state where the user is looking into a finder.

In the method disclosed in Japanese Patent Laid-Open No. 2012-129670, if the user's eyes approaching the finder is not detected and images are displayed in the order in which the images are captured by continuous shooting, there is a possibility that display of the images is started before a user can see the images on the display unit on the rear surface of the camera after the user's eyes approaching the finder are not detected. For example, a first captured image is reproduced first, and thus it is highly likely that the image may be switched to a second image while the user is keeping his/her eyes away from the finder, and the user may overlook the first image. An image pickup apparatus including no eyepiece sensor cannot detect a state where user's eyes are approaching the finder. Accordingly, if the display of an image for confirmation is started upon completion of continuous shooting, it is highly likely that the user may overlook the first captured image.

SUMMARY

In view of the above-described comments, the present disclosure is directed to reducing the likelihood of overlooking an image in a display of an image for confirmation after shooting after continuous shooting is performed.

According to one or more aspects of the present disclosure, an image pickup apparatus includes a finder unit configured to enable visual confirmation of an object image, a display unit located outside of the finder unit, and a control unit configured to control a display time for a first image acquired in a first shooting operation to be longer than a display time for a second image acquired in a second shooting operation in a case where a plurality of images is sequentially displayed on the display unit as a review display after continuous shooting is performed, the plurality of images being captured in the continuous shooting for continuously performing a plurality of shooting operations including at least the first shooting operation and the second shooting operation in response to a shooting instruction, the second shooting operation being performed after the first shooting operation.

Further features of the present disclosure will become apparent from the following description of exemplary embodiments (with reference to the attached drawings).

BRIEF DESCRIPTION OF THE DRAWINGS

FIG. 6 is a diagram illustrating, in chronological order, a case where continuous shooting is performed in a state where a live view image is displayed on a display unit on a rear surface of a camera according to the present exemplary embodiment.

FIGS. 7A to 7C are diagrams each illustrating a modified example of the present exemplary embodiment.

DESCRIPTION OF THE EMBODIMENTS

Preferred exemplary embodiments of the present disclosure will be described below with reference to the drawings.

Figure 1A:
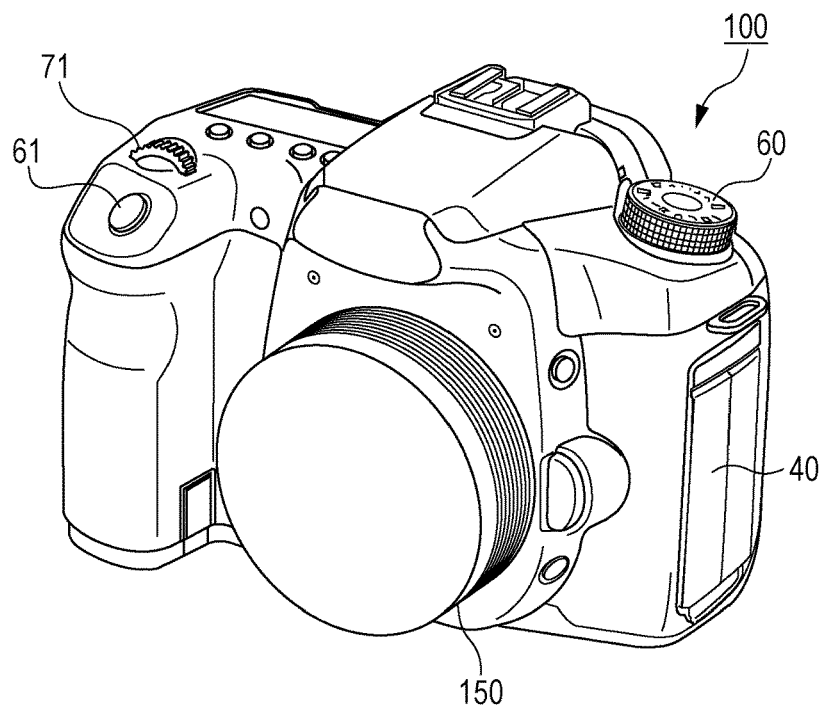
FIGS. 1A and 1B are outline views each illustrating a digital camera as an example of a device to which a configuration of the present exemplary embodiment can be applied.
Figure 1B:
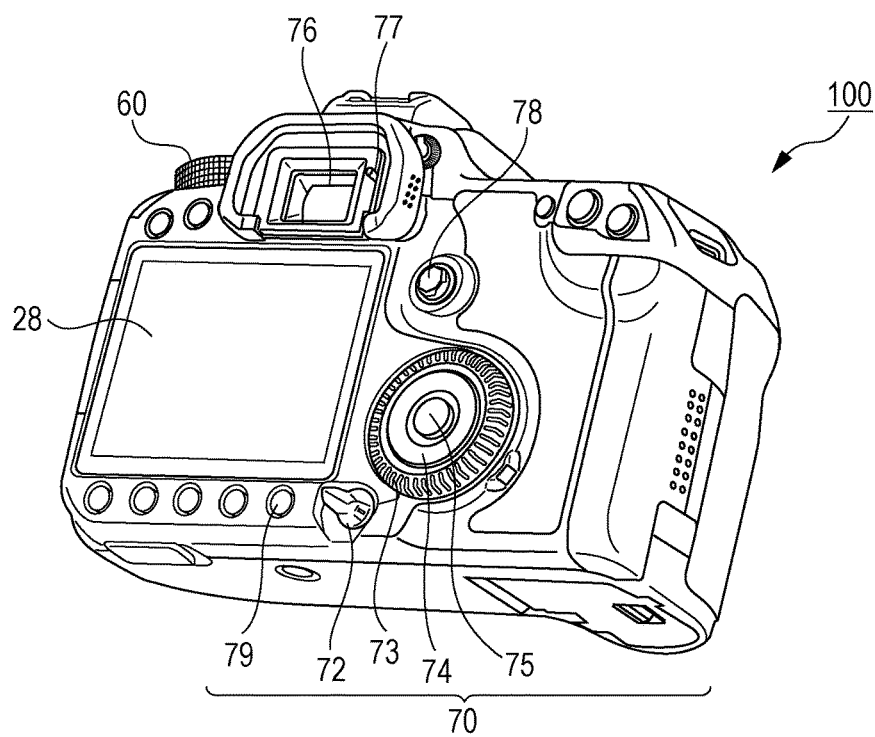

FIGS. 1A and 1B each illustrate an outline view of a digital camera 100 as an example of an apparatus to which the present disclosure can be applied. FIG. 1A is a front perspective view of the digital camera 100. FIG. 1B is a rear perspective view of the digital camera 100. Referring to FIGS. 1A and 1B, a display unit 28 is a display unit that displays images and various pieces of information, and is provided on a rear surface of a camera. A shutter button 61 is an operation unit for performing a shooting instruction. A mode selection switch 60 is an operation unit for switching various modes. A terminal cover 40 is a cover for protecting a connector (not illustrated) for a connection cable or the like for connecting a connection cable to be connected to an external device and the digital camera 100. A main electronic dial 71 is a rotary operation member included in an operation unit 70. Turning the main electronic dial 71 enables changing setting values such as a shutter speed and diaphragm settings. A power switch 72 is an operation member for turning on or off the power supply of the digital camera 100. A sub electronic dial 73 is a rotary operation member included in the operation unit 70 and enables moving a selection frame and image feeding. A directional pad 74 is a directional pad (four-way operation key) included in the operation unit 70. The left, right, top, and bottom portions of the directional pad 74 can be pressed. Operations corresponding to pressed portions of the directional pad 74 are possible. A SET button 75 is a push button included in the operation unit 70. The SET button 75 is mainly used to determine a selection item.

A lens unit 150 is a lens unit including a lens.

A finder 76 (finder unit) is configured to enable visual confirmation of an object image by a user who looks into the finder. The finder 76 may be an optical finder or an electronic viewfinder. When an optical finder is used as the finder 76, observation through a focusing screen enables confirmation a focus or composition of an optical image of a subject obtained through the lens unit 150. When an electronic viewfinder is used as the finder 76, the finder 76 can perform live view image display (through display). Note that the finder 76 includes an eye proximity detection sensor 77 and can detect an object approaching the finder 76 by a predetermined distance or more. In other words, the eye proximity detection sensor 77 can detect that the user is looking into the finder 76.

The rear surface of the digital camera 100 located outside of the finder 76 is provided with the display unit 28, which enables display of a live view image, a menu screen, and the like.

An LV button 78 is a button that is included in the operation unit 70 and switches ON and OFF of a live view (hereinafter "LV") in a still shooting mode. Specifically, when an optical finder is used as the finder 76, which is described below, display of the live view image on the display unit 28, which is located on the rear surface of the digital camera, and display of an optical image through the finder 76 can be switched. When an electronic viewfinder is used as the finder 76, display of the live view image on the display unit within the finder and display of the live view image on the display unit 28 on the rear surface of the digital camera can be switched.

A playback button 79 is a button that is included in the operation unit 70 and switches between a shooting mode and a playback mode. When the playback button 79 is pressed in the shooting mode, the mode is shifted to the playback mode, which enables display of a latest image among the images recorded in the recording medium 200 on the display unit 28. In the playback mode, images captured by continuous shooting can be displayed, instead of displaying images captured by single shooting. However, in the playback mode, the same display time for any one of the captured images (in the case of slide show display for automatically switching display images), or the image to be displayed can be switched by a switch instruction from the user.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 2:
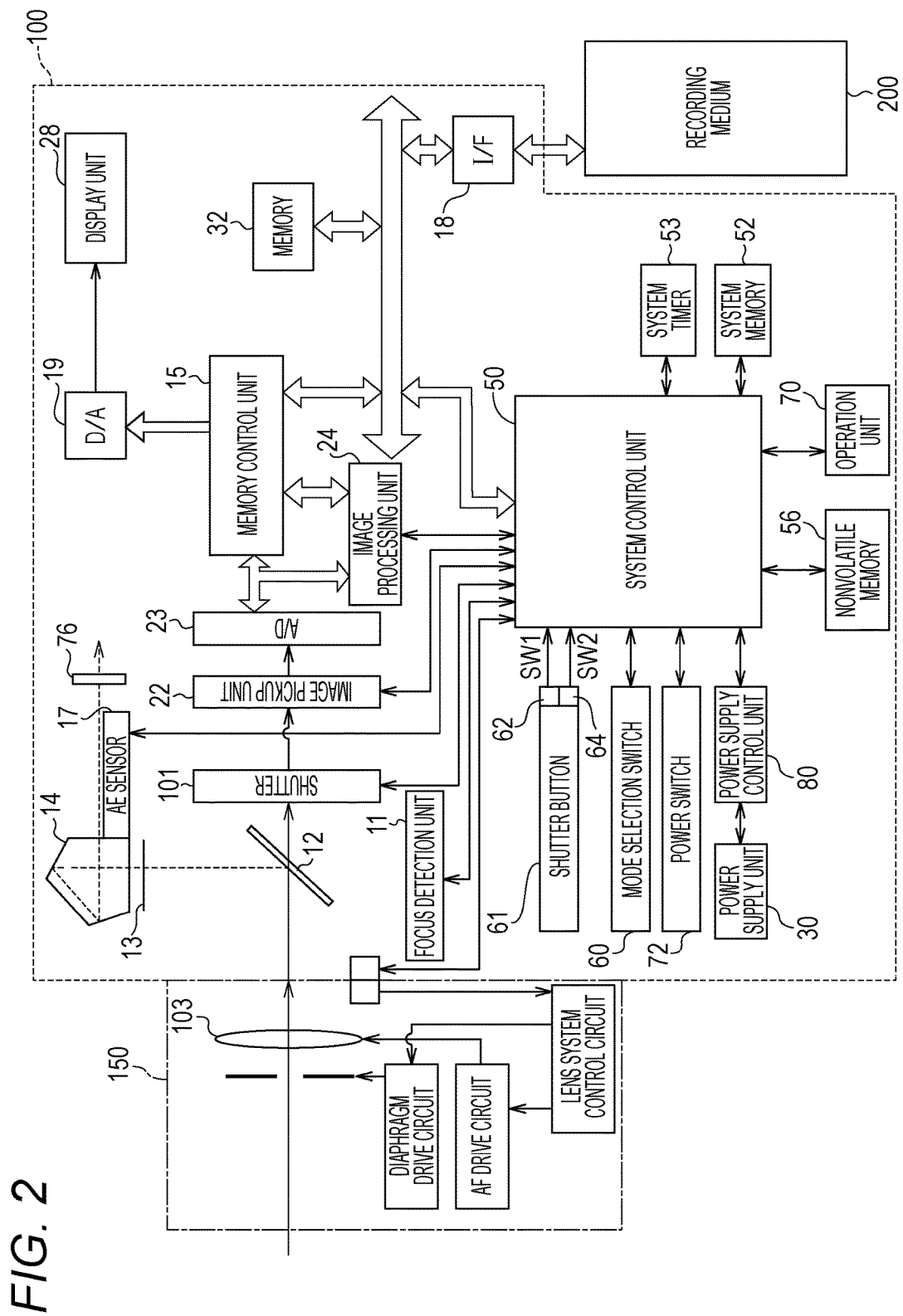
FIG. 2 is a block diagram illustrating a configuration example of a digital camera as an example of the device to which the configuration of the present exemplary embodiment can be applied.

FIG. 2 is a block diagram illustrating a configuration example of the digital camera 100 according to the present exemplary embodiment. The lens unit 150 is a lens unit incorporating an exchangeable shooting lens.

The lens 103 is generally composed of a plurality of lens. In this case, however, one lens is illustrated for ease of illustration.

An AE sensor 17 measures the brightness of a subject through the lens unit 150.

A focus detection unit 11 outputs defocus amount information to a system control unit 50. The system control unit 50 controls the lens unit 150 based on the defocus amount information, and performs a phase difference AF.

A quick-return mirror 12 (hereinafter referred to as the mirror 12) is moved up and down by an actuator, which is not illustrated, according to an instruction from the system control unit 50 during exposure, live view image capturing, and moving image capturing. The mirror 12 is a mirror for switching a light beam entering the lens 103 to a finder 76 side and an image pickup unit 22 side. The mirror 12 is disposed to guide and reflect the light beam onto the finder 76 during a normal operation. In the case of capturing images, or live view display, the mirror is moved upward so as to guide the light beam to the image pickup unit 22 and retreats from the light beam (mirror up). The mirror 12 is a half mirror that allows a part of light to transmit a central part of the mirror, and allows a part of the light beam to enter the focus detection unit 11 for detecting a focus.

When an optical finder is used, a photographer observes a focusing screen 13 through a pentaprism 14 and the finder 76, thereby enabling confirmation of a focus or composition of an optical image of a subject obtained through the lens unit 150.

The shutter 101 is a focal plane shutter capable of freely controlling an exposure time of the image pickup unit 22 by control of the system control unit 50.

The image pickup unit 22 is an image sensor composed of a CCD, a CMOS element, or the like that convers an optical image into an electric signal. An A/D (analog to digital) converter 23 converts an analog signal into a digital signal. The A/D converter 23 is used for converting the analog signal output from the image pickup unit 22 into a digital signal.

An image processing unit 24 performs predetermined pixel interpolation, resize processing, such as reduction, and color conversion processing on data from the A/D converter 23 or data from the memory control unit 15. Further, the image processing unit 24 performs a predetermined calculation process using captured image data, and the system control unit 50 performs exposure control and range finding control based on the obtained calculation result. Thus, a TTL (Through The Lens) autofocus (AF) process, an auto exposure (AE) process, and a flash preliminary emission (EF) process are carried out. The image processing unit 24 further performs a predetermined calculation process using captured image data, and a TTL AWB (automatic white balance) process based on the obtained calculation result. Output data from the A/D converter 23 is directly written into a memory 32 through the image processing unit 24 and the memory control unit 15, or through the memory control unit 15. The memory 32 stores image data that is obtained by the image pickup unit 22 and converted into digital data by the A/D converter 23, or image data to be displayed on the display unit 28. The memory 32 includes a sufficient storage capacity for storing a predetermined number of still images, and moving images and voices for a predetermined time.

The D/A (digital to analog) converter 19 converts data for image display stored in the memory 32 into an analog signal and supplies the analog signal to the display unit 28. In this manner, the image data for display that is written into the memory 32 is displayed on the display unit 28 through the D/A converter 19. The display unit 28 performs display according to the analog signal from the D/A converter 19 on a display device such as an LCD. Digital signals that are subjected to A/D conversion once by the A/D converter 23 and are accumulated in the memory 32 are converted into an analog signal in the D/A converter 19 and are sequentially transferred and displayed on the display unit 28, thereby making it possible to function as an electronic viewfinder and perform a through image display (live view display). Further, when an electronic viewfinder is used as the finder, the display of an image subjected to an analog conversion, like in the display unit 28, enables live view image display.

A nonvolatile memory 56 is an electrically erasable/recordable memory. For example, an EEPROM is used as the nonvolatile memory 56. The nonvolatile memory 56 stores a constant, a program, and the like for operation of the system control unit 50. The term "program" described herein refers to a program for executing various flowcharts, which are described below, in the present exemplary embodiment.

The system control unit 50 is a control unit and may include at least one processor, at least one memory, circuitry, firmware, hardware, other component, or the like, and may control the entire digital camera 100. Processes in the present exemplary embodiment described below may be implemented by executing the programs recorded in the nonvolatile memory 56 described above. For example, the system control unit 50 or other circuitry may read one or more programs, instructions, codes, or the like, stored in one or more memories, and then execute the programs, instructions, codes, or the like, to implement operations of one or more aspects of the present disclosure. A RAM may be used as the system memory 52. A constant and a variable for operation of the system control unit 50, and a program and the like read out from the nonvolatile memory 56 are loaded into the RAM. The system control unit 50 also performs display control by controlling the memory 32, the D/A converter 19, the display unit 28, and the like.

The system timer 53 is a clocking unit that measures the time used for various control operations, or the time of an incorporated clock.

The mode selection switch 60 (selectively) switches the operation mode of the system control unit 50 to any one of a still image recording mode (single shooting mode), a moving shooting mode, a continuous shooting mode, a self-timer shooting mode, and the like.

A first shutter switch 62 is turned on when the shutter button 61, which is provided on the digital camera 100 is operated halfway, so-called half-pressed (shooting preparation instruction), and generates a first shutter switch signal SW1. The first shutter switch signal SW1 starts the operation of an autofocus (AF) process, an auto exposure (AE) process, an automatic white balance (AWB) process, a flash preliminary emission (EF) process, or the like.

A second shutter switch 64 is turned on when the shutter button 61 is fully operated, so-called fully-pressed (shooting instruction), and generates a second shutter switch signal SW2. The second shutter switch signal SW2 allows the system control unit 50 to start the operation of a series of shooting processes from reading of the signal from the image pickup unit 22 to writing of the image data into the recording medium 200.

A continuous shooting operation (continuous shooting) is carried out in a period in which the second shutter switch signal SW2 is generated, and the continuous shooting operation ends when the generation of the second shutter switch signal SW2 is stopped. In the continuous shooting operation, the number of captured images increases as the period in which the shutter button 61 is pressed increases. In the continuous shooting operation, settings of a focus position and exposure for the first shooting are fixed until the last shooting is finished. In the continuous shooting operation, the user can set up to 200 images to be captured. The speed of the continuous shooting operation can be set to, for example, one to 14 images per second.

The operation unit 70 includes various operation members each serving as an input unit that receives a user's operation. The operation unit 70 includes at least the following operation units: the shutter button 61, the main electronic dial 71, the power switch 72, the sub electronic dial 73, the directional pad 74, the SET button 75, the LV button 78, and the playback button 79.

A power supply control unit 80 is composed of a battery detecting circuit, a DC-DC converter, a switch circuit for switching blocks to be energized, and the like, and detects the presence or absence of mounting of a battery, the type of a battery, and a remaining battery capacity. Further, the power supply control unit 80 controls the DC-DC converter based on the detection result and an instruction from the system control unit 50, and supplies each unit including the recording medium 200 with a desired voltage for a desired period.

The power supply unit 30 is composed of a primary battery, such as an alkaline battery or a lithium battery, a secondary battery, such as an NiCd battery, an NiMH battery, or an Li battery, an AC adapter, or the like. The power switch 72 is a switch that accepts an operation for turning on or off the power of the digital camera 100.

The recording medium I/F 18 is an interface with the recording medium 200 such as a memory card or a hard disk. The recording medium 200 is a recording medium such as a memory card for recording captured images, and is composed of a semiconductor memory, a magnetic disk, or the like.

Figure 3:
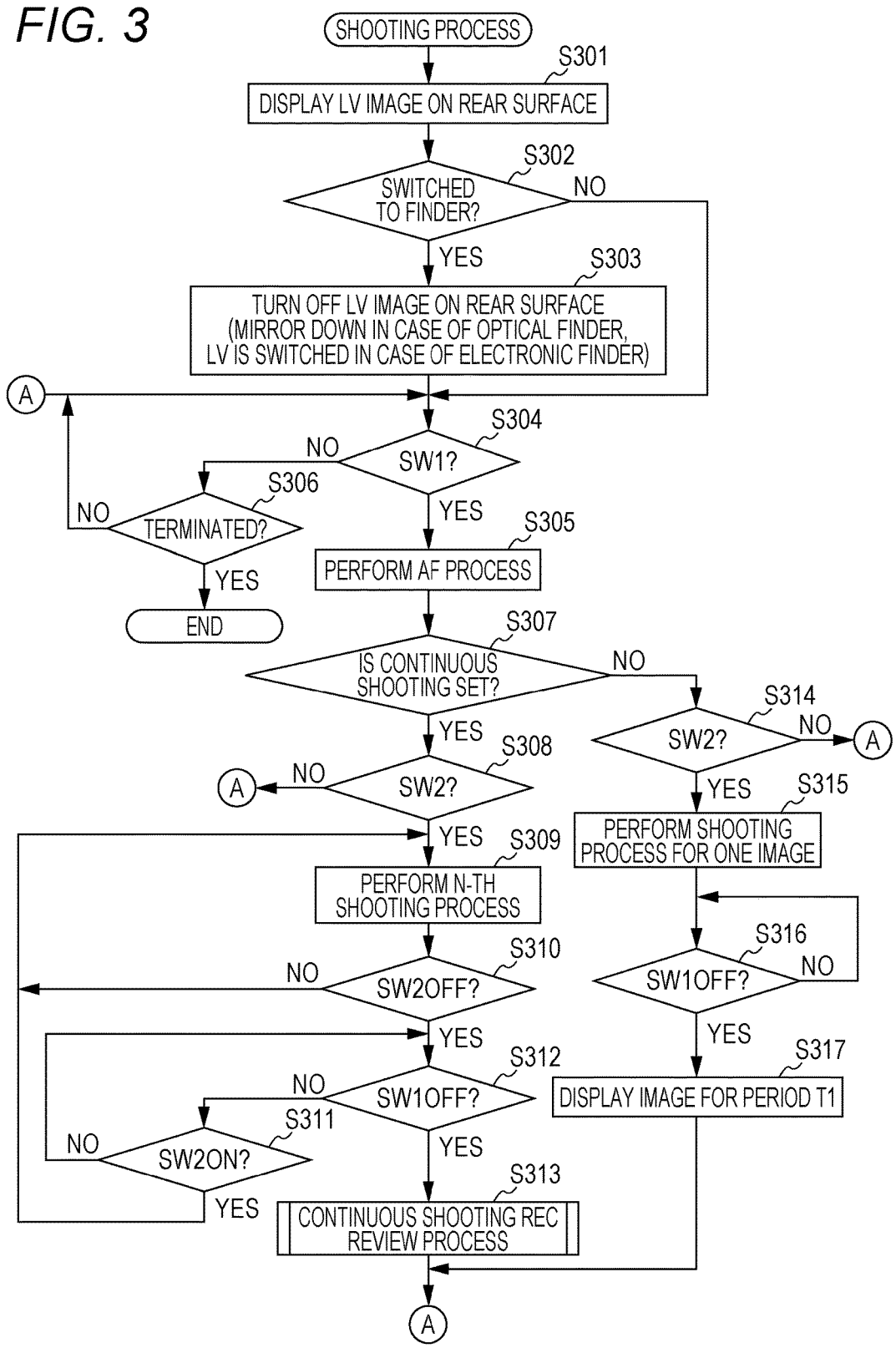
FIG. 3 is a flowchart illustrating a shooting process in the present exemplary embodiment.

A shooting process according to the present exemplary embodiment will be described with reference to the flowchart of FIG. 3. The shooting process of FIG. 3 is started when the digital camera 100 is turned on and start-up is completed to be ready for shooting. This process is implemented in such a manner that a program recorded in the nonvolatile memory 56 is loaded into the system memory 52 and the program is executed by the system control unit 50.

In S301, the system control unit 50 displays a through image (live view image, LV image) on the display unit 28.

In S302, the system control unit 50 determines whether the operation for switching the state where a subject can be observed through the finder 76 when the LV button 78 is pressed. Specifically, when the finder 76 is an optical finder, the mirror is moved down and an optical path leading to the image pickup unit 22 is blocked, so that the LV image is displayed on the display unit 28, and it is determined whether an optical image is visible through the finder 76. When the finder 76 is an electronic viewfinder, it is determined whether the destination where the LV image is displayed has been switched from the display unit 28 to the display unit within the finder. When it is determined that the LV button 78 is pressed, the processing proceeds to S303. When it is determined that the LV button 78 is not pressed, the processing proceeds to S304. Note that in the present exemplary embodiment, the LV image is displayed on the display unit 28 at the timing when the digital camera 100 is turned on. However, the state where an object image is visible through the finder 76 may be set first.

In S303, the system control unit 50 switches the state from a state in which the LV image is displayed on the rear surface of the display unit 28 to a state in which an object image within the finder is visible. Specifically, when the finder 76 is an optical finder, the mirror is moved down and the optical path leading to the image pickup unit 22 is blocked, so that the optical image is visible through the finder. When the finder 76 is an electronic viewfinder, the destination where the LV image is displayed is switched from the display unit 28 to the display unit within the finder.

In S304, the system control unit 50 determines whether the shutter button 61 is half pressed, or whether the state of SW1 is obtained. When it is determined that the shutter button 61 is half pressed, the processing proceeds to S305. When it is determined that the shutter button 61 is not half pressed, the processing proceeds to S306.

In S305, the system control unit 50 performs an autofocus (AF) process.

In S306, the system control unit 50 determines whether the operation for terminating the shooting process is performed. The shooting process is terminated by turning off the digital camera 100, switching the operation mode to the playback mode, or performing the operation for displaying the menu screen. When it is determined that the operation for terminating the shooting process is performed, the shooting process is terminated. When it is not determined that the operation for terminating the shooting process is performed, the processing proceeds to S304.

In S307, the system control unit 50 determines whether the shooting mode is set as the continuous shooting operation by the operation of the mode selection switch 60. When it is determined that the shooting mode is set as the continuous shooting operation, the processing proceeds to S308. When it is not determined that the shooting mode is set as the continuous shooting operation, the processing proceeds to S313.

Figure 5:
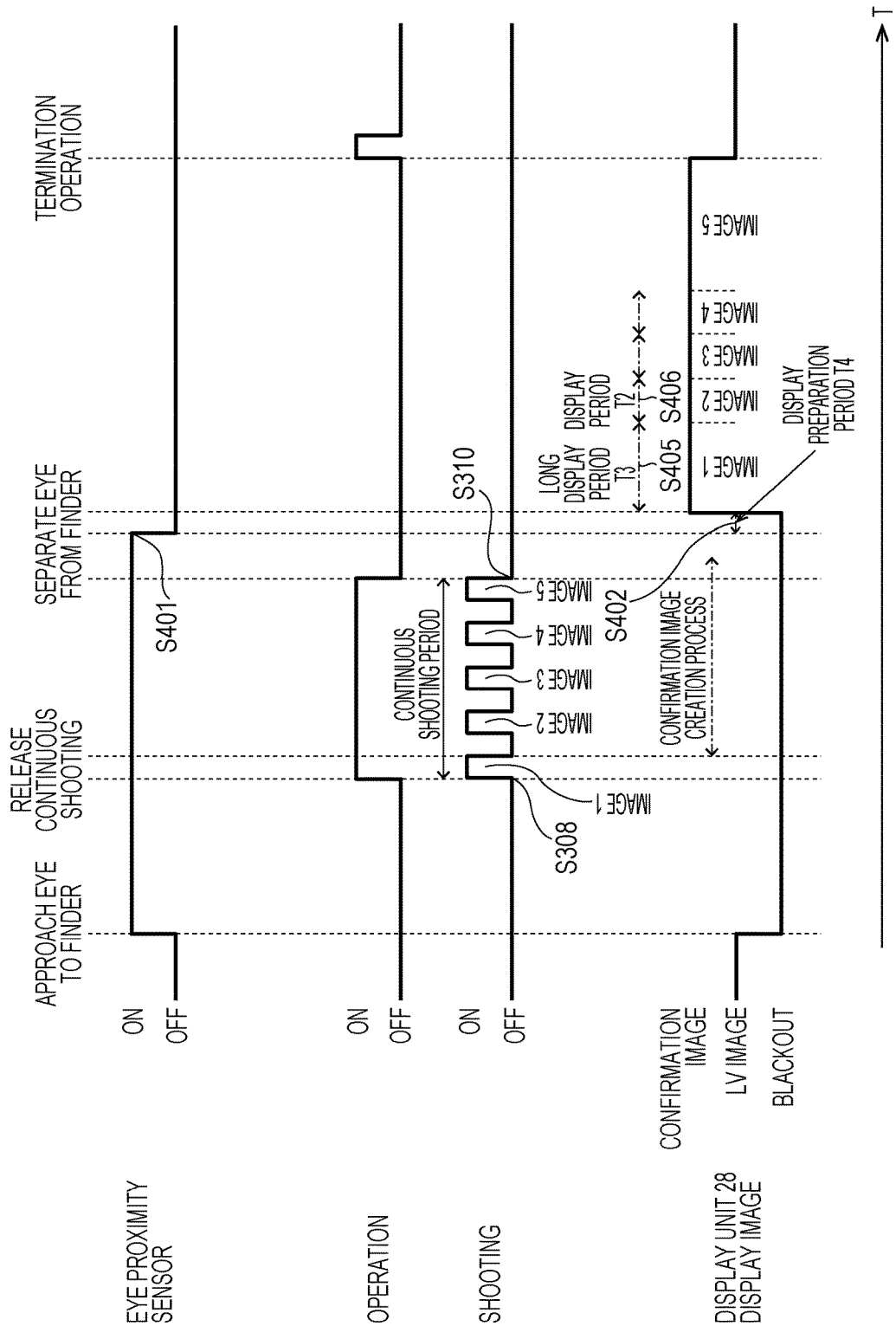
FIG. 5 is a diagram illustrating, in chronological order, a case where continuous shooting is performed in a state where a user is looking into a finder according to the present exemplary embodiment.

In S308, the system control unit 50 determines whether the shutter button 61 is fully pressed, or the state of SW2 is obtained. When it is determined that the shutter button 61 is fully pressed, the processing proceeds to S309. When it is not determined that the shutter button 61 is fully pressed, the processing proceeds to S304. FIG. 5 is a diagram illustrating, in chronological order, an eyepiece sensor detection state, a state indicated by a shooting instruction (SW2 is ON or not), a shooting state, a shooting state, and a display of images when shooting is performed in a state where a user is looking into the finder 76 according to the present exemplary embodiment. The process of S308 corresponds to start of capturing a first image in FIG. 5.

In S309, the system control unit 50 performs an N-th shooting process. N is incremented as N=N+1 every time the process of S309 is performed. That is, the number N of captured images continuously increases after shooting of second and subsequent images after the first image, unless the determination result indicates Yes in S310 described below. The number N of captured image is recorded in the system memory 52. Note that the AF process in S305 is not performed every time shooting is performed, but instead shooting of second and subsequent images is carried out based on the AF process performed before shooting of the first image. The process of S309 corresponds to a period between S308 and S310 illustrated in FIG. 5. During this period, an image creation process for confirmation is sequentially performed (from the image acquired by the image pickup unit), and is continued until the image creation process for the N-th captured image is finished. Note that the image for confirmation can be displayed for a short period of time without improving the image quality as compared to the image displayed in the playback mode. This allows the user to roughly confirm the state of the captured image.

In S310, the system control unit 50 determines whether the fully-pressed state of the shutter button 61 is released, or whether SW2 is released. When it is determined that the fully-pressed state of the shutter button 61 is released, the processing proceeds to S311. When it is not determined that the fully-pressed state of the shutter button 61 is released, the processing proceeds to S309.

In S311, the system control unit 50 determines whether the shutter button 61 is fully pressed, or whether the state of SW2 is obtained. When it is determined that the shutter button 61 is fully pressed, the processing proceeds to S309 to perform continuous shooting again. When it is not determined that the shutter button 61 is fully pressed, the processing proceeds to S312. In S310, when SW2 is turned off once and SW2 is turned on without turning off the SW1, the continuous shooting operation is performed again. However, the continuous shooting operation started when the determination results indicates Yes in S311 is not recorded after the previous continuous shooting operation, but instead the continuous shooting operation for the first image is started. Even when the continuous shooting operation is continuously performed, the setting of the AF process performed prior to the first continuous shooting operation is fixed.

In S312, the system control unit 50 determines whether the half-pressed state of the shutter button 61 is released, or whether SW1 is released. When it is determined that the half-pressed state of the shutter button 61 is released, the processing proceeds to S313. When it is not determined that the half-pressed state of the shutter button 61 is released, the processing stands by until SW1 is released.

In S313, the system control unit 50 performs a continuous shooting REC review process (continuous shooting review display process). The continuous shooting REC review process is described below with reference to FIG. 4. When the continuous shooting operation is continuously performed several times, the image captured in the last continuous shooting operation is displayed.

The process of S314 to S317 is not the continuous shooting operation, but is the process performed in the case of single shooting.

In S314, the system control unit 50 determines whether the shutter button 61 is fully pressed, or the state of SW2 is obtained. When it is determined that the shutter button 61 is fully pressed, the processing proceeds to S315. When it is not determined that the shutter button 61 is fully pressed, the processing proceeds to S304.

In S315, the system control unit 50 performs a shooting process for one image.

In S316, the system control unit 50 determines whether the half-pressed state of the shutter button 61 is released, or whether the state of SW1 is released. When it is determined that the half-pressed state of the shutter button 61 is released, the processing proceeds to S317. When it is not determined that the half-pressed state of the shutter button 61 is released, the processing stands by until SW1 is released.

In S317, the system control unit 50 displays the captured image captured in the previous S314 on the display unit 28 for a predetermined period T1 (REC review, display for confirmation after shooting). T1 represents a period of time, such as two seconds or 1.5 seconds.

Note that the determination as to whether the continuous shooting operation is performed in S307 may be made prior to S304.

Next, the continuous shooting REC review process in S313 illustrated in FIG. 3 will be described with reference to FIG. 4. This process is started when the processing proceeds to S312 illustrated in FIG. 3 (as review display after continuous shooting). This process is implemented in such a manner that a program recorded in the nonvolatile memory 56 is loaded into the system memory 52 and the system control unit 50 executes the program. Note that when the continuous shooting operation is continuously performed a plurality of times in FIG. 3, a plurality of images captured in the last continuous shooting operation is displayed as images for confirmation in FIG. 4.

In S401, the system control unit 50 determines whether the eye proximity detection sensor 77 detects an object approaching the sensor (eye proximity is being detected). When it is determined that the eye proximity detection sensor 77 detects an object approaching the sensor, the processing stands by until no approaching object is detected. When it is not determined that the eye proximity detection sensor 77 detects an object approaching the sensor (approaching object is not detected), the processing proceeds to S402. The process of S401 corresponds to turning off of the eyepiece sensor after shooting is finished (after S310) in FIG. 5.

In S402, the system control unit 50 performs a display preparation process (predetermined period T4). The process of S402 corresponds to the period after S401 illustrated in FIG. 5. After completion of the display preparation process (the image for confirmation can be displayed), the processing proceeds to the process for displaying the image captured in S403. The time for the display preparation process is, for example, 0.2 seconds or 0.3 seconds.

In S403, the system control unit 50 determines whether the continuous shooting operation is performed in a state where the LV image is displayed on the display unit 28. When it is determined that the shooting operation is performed in the state where the LV image is displayed on the display unit 28, the processing proceeds to S404. When it is not determined that the eye proximity detection sensor 77 detects an object approaching the sensor (shooting is performed in a state where the optical image is visible within the optical finder, or a state where the LV image is displayed through the electronic viewfinder), the processing proceeds to S405. Note that the determination in S403 may be made based on whether shooting is performed in a state where the eye proximity detection sensor 77 is not detecting any object approaching the sensor.

In S404, the system control unit 50 displays the first captured image captured in the continuous shooting operation on the display unit 28 for a predetermined period T2. T2 represents a period of time such as one second or 1.5 seconds. FIG. 6 is a diagram illustrating, in chronological order, an eyepiece sensor detection state, a state indicated by a shooting instruction (SW2 is ON or not), a shooting state, and a display of images according to the present exemplary embodiment. The process of S308 corresponds to start of the first shooting in FIG. 5. FIG. 6 is a diagram illustrating, in chronological order, an eyepiece sensor detection state, a state indicated by a shooting instruction (SW2 is ON or not), shooting state, and a display of images when shooting is performed without using the finder 76 according to the present exemplary embodiment. Steps up to S310 are the same as those in FIG. 5. Since shooting is performed in a state where the user is not looking into the finder, or in a state where the user is viewing the LV image of the display unit 28, it is less likely that the user may overlook the first captured image even when the first captured image is displayed on the display unit 28. Accordingly, as illustrated in FIG. 6, in S404, the first image is displayed on the display unit 28 for the same period of time as the display time for the second and subsequent captured images.

In S405, the system control unit 50 displays, on the display unit 28, the first captured image captured in the continuous shooting operation for a predetermined period T3 which is longer than the predetermined period T2. T3 represents a period such as two seconds or three seconds. The process of S405 corresponds to a display time for an image 1 illustrated in FIG. 5, and illustrates that the image 1, which is the first captured image, is displayed for a period of time longer than a display time for an image 2 and subsequent images. At a timing when an object approaching the finder 76 is not detected, or at a timing when withdrawal of the user's eyes from the finder 76 is started, it is highly likely that the user is not viewing the display unit 28, or only a part of the display unit is visible, like when the LV image is displayed on the display unit 28 and the continuous shooting operation is performed. Accordingly, after the user recognizes that the display of the first captured image is started (REC review is started) by increasing the display time for the first captured image, it is highly likely that there is a time for confirming the first captured image even when a line of sight is moved to the display unit 28. On the other hand, if the display time is set to be the same as the display time for the second captured image and subsequent images, an eye-non-approaching state may be obtained after the withdrawal of the user's eyes is started, and when the user can properly view the image on the display unit 28, the display of the first captured image may be completed and the second or third captured image may be displayed. In S405, the display of the first captured image for T3, which is longer than the display time for the second and subsequent images, reduces the likelihood for the user to overlook the first captured image. In S401, after the eye approaching the finder is not detected, the first captured image is immediately displayed after the display preparation process. However, if the display is started after a lapse of a certain period of time so as to prevent the user from overlooking the first captured image, there is a possibility that the user may feel that the response is slow. If the user shifts from the eye approaching state to the eye withdrawal state and the user is waiting until the captured image for confirmation on the display unit 28 is displayed but the image is not displayed immediately, the user may feel that the eye withdrawal state is not recognized by the camera, or it takes a long time for displaying the image. Therefore, it is preferable to immediately display the captured image for confirmation after completion of shooting. However, if the display is started immediately after completion of shooting and the display of the image is immediately switched to the display of the subsequent image, there is a possibility that the user may overlook the first captured image, and the first captured image is displayed for a longer period of time.

In S406, the system control unit 50 displays an (n+1)th captured image after the second captured image on the display unit 28 for the predetermined period T2. The n-th captured image used herein refers to a captured image displayed immediately before. Specifically, when the continuous shooting operation is performed in the state where the user is looking into the finder 76, the first captured image is displayed for a period of time longer than that for the second and subsequent captured images. When the continuous shooting operation is performed while the user is viewing the display unit 28 on the rear surface of the camera, the first captured image is displayed for the same period of time as that for the second and subsequent captured images. In other words, the display time for the first captured image is changed based on whether shooting is performed in the state where the user is looking into the finder 76 when the continuous shooting operation is performed.

In S407, the system control unit 50 determines whether the captured image displayed in the previous S406 is the N-th captured image, or the last captured image in the continuous shooting operation. When it is determined that the captured image is the N-th captured image, the continuous shooting REC review process is terminated. When it is not determined that the captured image is the N-th captured image, the processing proceeds to S406 to display the subsequent captured image. In displaying the captured image for confirmation in the continuous shooting operation, the display is switched to the subsequent captured image automatically without a user's operation, for example, after a lapse of a predetermined period of time after the display of the first captured image. In other words, images captured in the continuous shooting operation are automatically sequentially displayed (can be sequentially displayed).

Note that during the display of the images captured in the continuous shooting operation, when the user operates the operation unit 70, it is highly likely that the user attempts to perform another operation. Accordingly, the continuous shooting REC review process is terminated even if the display of the N-th captured image is not terminated in response to the operation on the operation unit 70 (during display of the captured image prior to the N-th image).

According to the exemplary embodiments described above, the continuous shooting operation performed by the user using the finder, the captured image makes it possible to reduce the likelihood of overlooking the captured image.

Figure 7A:
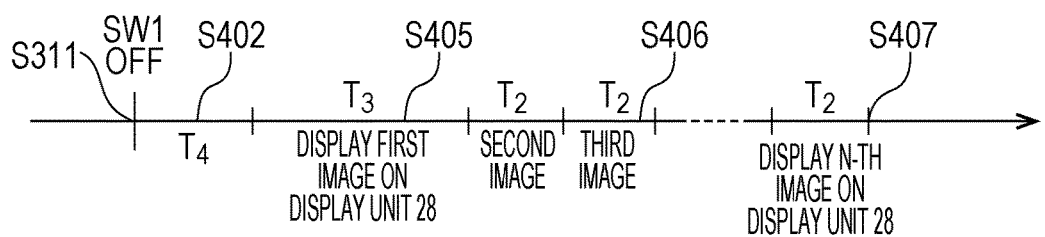
Figure 7B:
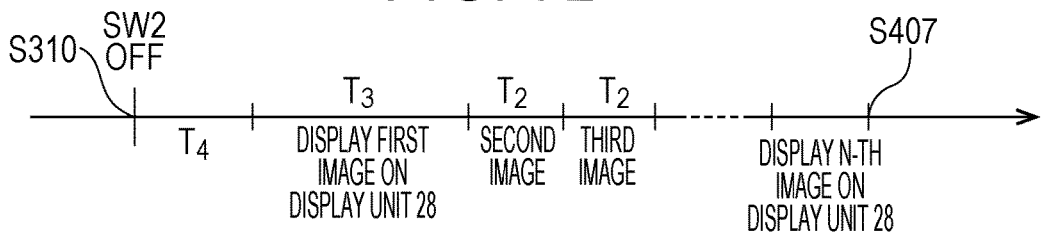

A modified example of the present exemplary embodiment will be described with reference to FIGS. 7A to 7C. FIGS. 7A to 7C each illustrate a modified example in which the user performs the continuous shooting operation in the state where the user is looking into the finder 76.

FIG. 7A is a diagram illustrating that REC review is started when the determination result in S311 of FIG. 3 indicates Yes, or when SW1 is turned off (state where the shutter button 61 is not pressed) after the continuous shooting operation. When the determination result in S311 indicates Yes, the display preparation process corresponding to S402 in FIG. 4 is performed and then the display of the first captured image corresponding to S405 is performed for a period of time longer than that for the second and subsequent captured images. In the modified example of FIG. 7A, REC review for the continuous shooting operation is started when SW1 is turned off, without depending on the determination as to whether the eye proximity detection in S401 of FIG. 4 is performed. The modified example of FIG. 7A can also be applied to an image pickup apparatus which does not include the eye proximity detection sensor 77. After SW2 is turned on to start the continuous shooting operation, SW2 is turned off and the ON state of SW1 is maintained, thereby enabling the user to start REC review of the continuous shooting operation by turning off SW1 at a desired timing. The REC review of the continuous shooting operation is not performed unless SW1 is turned off. However, when the user is looking into the finder 76, the user operates the digital camera 100 while gripping and holding the digital camera 100. Accordingly, the ON state of SW1 cannot be held in the middle of shifting from the eye approaching state to the eye-non-approaching state, and thus it is highly likely that the user may unintentionally turn off SW1. However, according to the modified example illustrated in FIG. 7A, the display time for the first captured image is long, which makes it possible to reduce the likelihood for the user to overlook the first captured image.

FIG. 7B is a diagram illustrating that REC review is started when the determination result in S310 of FIG. 3 indicates Yes, i.e., SW2 is turned off, and an instruction for terminating the continuous shooting operation is made. Upon completion of the continuous shooting operation, the display preparation process corresponding to S402 of FIG. 4, and then the display of first captured image corresponding to S405 is performed for a period of time longer than that for the second and subsequent captured images. In the modified example of FIG. 7B, REC review of the continuous shooting operation is started when SW2 is turned off, without depending on the determination as to whether SW1 is turned off in S311 of FIG. 3, and the determination as to whether the eye proximity detection in S401 of FIG. 4 is performed.

The modified example of FIG. 7B can also be applied to an image pickup apparatus which does not include the eye proximity detection sensor 77.

Figure 4:
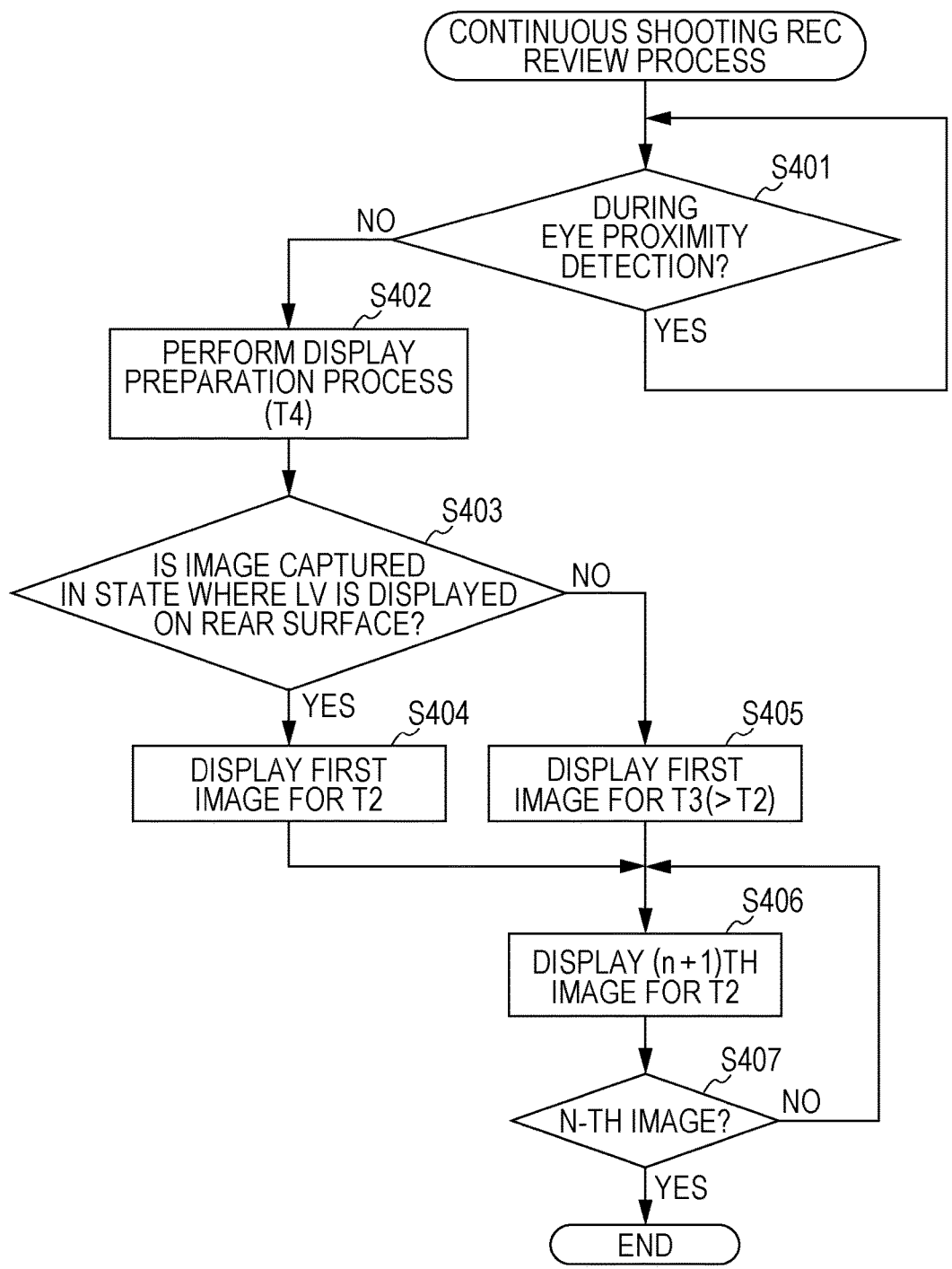
FIG. 4 is a flowchart illustrating a continuous shooting REC review process in the present exemplary embodiment.

Note that the display time for the first captured image in the modified example may be set to be longer than that when the display of the first captured image is started when the eye proximity is not detected in S401 of FIG. 4. Even if the user's eyes are not approaching the finder, the display of the image on the display unit 28 that has not been displayed during shooting is started, so that the user can recognize that REC review has started.

FIG. 7C illustrates a case where the REC review is started in the display unit in the finder when the finder 76 is an electronic viewfinder. In the exemplary embodiments and modified examples described above, the display unit 28 displays the REC review. However, the REC review may be displayed on the display unit within the finder. In the modified example illustrated in FIG. 7C, the display preparation process corresponding to S402 of FIG. 4 is performed after the continuous shooting operation is completed at a timing 701 and the creation of the image for confirmation is completed. Upon completion of the display preparation process, the display of the first captured image is started at a timing 702. At this time, the user's eyes are approaching the finder and the user visually confirms the display unit within the finder, and the display time for the second and subsequent captured images is set to the same time T2. As illustrated in a timing 703, when the user's eyes withdraw from the finder during the display on the display of the second captured image on the display unit within the finder (i.e., determination result in S401 of FIG. 4 indicates NO), the predetermined time is extended from T2 to T3 for displaying the second image. Thus, the likelihood for the user to overlook the second image when the image is switched from the second image to the third image during the time when the user's eyes withdraw from the finder is reduced. Further, as shown in a timing 704, even when it is detected that the user's eyes are approaching the finder, the predetermined time is extended from T2 to T3 for displaying the fourth captured image being displayed. Referring to FIG. 7C, when the state of eye proximity to the finder 76 is changed during the REC review, the display time for the captured image being displayed is increased. Accordingly, the likelihood of overlooking the captured image is reduced even when the user changes the eye approaching state during the display. Note that when the user changes the eye approaching state after the user confirms the captured image being displayed, the display time for the image to be subsequently displayed may be increased, instead of increasing the display time for the image being displayed. Specifically, for example, when four thirds of the predetermined period T2 has elapsed, the predetermined time for the captured image being displayed is not changed from T2 even when the eye approaching state is changed, and the predetermined time for the captured image to be subsequently displayed may be increased to T3. The display time for the captured image being displayed and the display time for the captured image to be subsequently displayed may be increased.

According to the modified examples described above, the likelihood for the user to overlook the captured image when the eye approaching state is changed in the REC review after shooting in the continuous shooting operation can be reduced.

Note that start of measurement of the display time for the first captured image may be delayed by a period designated by the user in advance in the continuous shooting operation in the state where the user is looking into the finder. That is, the first captured image is switched to the second captured image after a lapse of a period which is designated by the user +T3. At this time, the first captured image may or may not be displayed during the period designated in advance by the user.

Among the images captured in the continuous shooting operation, the predetermined time for displaying a predetermined number of captured image, such as the first image, the second image, or the third image, may be increased, or the predetermined time for displaying the first to the predetermined number of captured images may be gradually shortened. Specifically, for example, the display time for the first image is three seconds, the display time for the second image is 2.5 seconds, the display time for the third image is 2.0 seconds, the display time for the fourth image is 1.5 seconds, and the display time for the fifth image is one second.

Note that start of measurement of the predetermined time for displaying the first captured image may be delayed also when the continuous shooting operation is performed in the state where the LV image is displayed on the display unit 28. In a case where the user shifts the display unit 28 to be held to easily view the display unit 28 after the user holds the digital camera 100 for capturing images after the continuous shooting operation, if the display time for the first captured image is the same as the display time for the second and subsequent captured images, the user may overlook the first captured image during the time when the user is shifting the display unit. However, the user can confirm the captured image by delaying the start of measurement of the predetermined time for the first display, without overlooking the captured image in the continuous shooting operation.

The display time for the captured image in the first shooting illustrated in S316 of FIG. 3 may be equal to or longer than the display time for the second and subsequent captured images in the continuous shooting operation. In the case of one image capture, it is highly likely that the user wishes to confirm the details of the captured image, the details of the captured image can be confirmed more easily when the display time for one captured image is set to be longer than that in the continuous shooting operation. In the case of the continuous shooting operation, the user wishes to confirm the entire image of a plurality of images obtained in the continuous shooting operation, or the motion of a subject, and the user can rapidly confirm the captured image when the display time is shorter than that for one captured image.

The above-described predetermined time is merely an example, and may be set by the user, or the time T2 or T3 may be adjusted depending on the number of continuous shooting operations. That is, since the time for displaying all captured images increases as the number of captured images increases, T2 or T3 may be set as a short period of time. Alternatively, the display time may be set to be constant even when the number of captured images increases, and only a predetermined number of images, such as 15 or 20 images, may be displayed.

Note that the above-described various control operations are executed by the system control unit 50, but instead may be executed by one piece of hardware, or the overall apparatus may be controlled by sharing the operations by a plurality of pieces of hardware.

The present disclosure has been described above based on preferred exemplary embodiments of the present disclosure. However, the present disclosure is not limited to these specific exemplary embodiments, and various modes are included in the present disclosure without departing from the scope of the disclosure. Further, the exemplary embodiments described above are merely examples of the present disclosure, and the exemplary embodiments can be combined as appropriate.

The exemplary embodiments described above illustrate a case where the present disclosure is applied to the digital camera 100. However, the present disclosure is not limited to these examples and can be applied to any image pickup apparatus, as long as the image pickup apparatus is capable of performing the continuous shooting operation and includes a finder. Specifically, the present disclosure can be applied to a mobile phone terminal or portable image viewer including a finder, a printer apparatus including a finder, a digital photo frame, a music player, a game console, an electronic book reader, and the like.

Other Exemplary Embodiments

The present disclosure may also be implemented by executing the following process. That is, software (program) for implementing the functions of the exemplary embodiments described above may be supplied to a system or apparatus via a network or various recording media, and a computer (or a CPU, an MPU, etc.) in the system or apparatus reads out a program code and executes the program code. In this case, the program and the recording media storing the program may constitute the present disclosure.

According to the present disclosure, in display of an image for confirmation after shooting after continuous shooting is performed, the likelihood of overlooking the image can be reduced.

Other Embodiments

Embodiment(s) of the present disclosure can also be realized by computerized configuration(s) of a system or apparatus that read out and execute computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-019037, filed Feb. 3, 2017, which is hereby incorporated by reference herein in its entirety.

What is claimed is:

1. An image pickup apparatus comprising:
    a finder unit configured to enable visual confirmation of an object image;
    a display unit located outside of the finder unit; and
    a control unit configured to control a display time for a first image acquired in a first shooting operation to be longer than a display time for a second image acquired in a second shooting operation in a case where a plurality of images is sequentially displayed on the display unit as a review display after continuous shooting is performed, the plurality of images being captured in the continuous shooting for continuously performing a plurality of shooting operations including at least the first shooting operation and the second shooting operation in response to a shooting instruction, the second shooting operation being performed after the first shooting operation.

2. The image pickup apparatus according to claim 1, wherein in the continuous shooting, a plurality of images is continuously captured for a period in which the shooting instruction is made.

3. The image pickup apparatus according to claim 1, wherein the continuous shooting further includes a third shooting operation and a fourth shooting operation to be performed after the second shooting operation, and the display time for the second image is equal to each of a display time for a third image acquired in the third shooting operation and a display time for a fourth image acquired in the fourth shooting operation.

4. The image pickup apparatus according to claim 1, further comprising a switching unit configured to be able to switch an operation mode to a playback mode for playing back an image recorded in a recording medium,
    wherein in the playback mode, in a case where the plurality of images captured in the continuous shooting is displayed by automatically sequentially switching the plurality of images, the display time for the first image is equal to the display time for the second image.

5. The image pickup apparatus according to claim 1, wherein in the review display, the plurality of images captured in the continuous shooting is displayed by sequentially switching the images without a user's operation.

6. The image pickup apparatus according to claim 1, wherein
    the display unit is configured to be able to display an image captured by an image pickup unit as a live view image, and
    the control unit performs the control when the continuous shooting is performed in a state where a live view image is not displayed on the display unit.

7. The image pickup apparatus according to claim 6, wherein the control unit performs the control in such a manner that the display time for the first image is equal to the display time for the second image in the review display when the continuous shooting is performed in a state where the live view image is displayed on the display unit.

8. The image pickup apparatus according to claim 1, wherein the first shooting operation is a first shooting in the continuous shooting, and the second shooting operation is a second shooting in the continuous shooting.

9. The image pickup apparatus according to claim 1, wherein the control unit performs the control in such a manner that an image to be displayed on the display unit is switched to the second image upon a lapse of a first period after the first image is displayed on the display unit in the review display after continuous shooting, and the image to be displayed on the display unit is further switched to a third image upon a lapse of a second period shorter than the first period after the second image is displayed, the third image being acquired in shooting performed after the second shooting operation.

10. The image pickup apparatus according to claim 9, wherein the control unit performs the control in such a manner that the image is switched to a fourth image upon a lapse of the second period after the third image is displayed, the fourth image being acquired in shooting performed after the third image is captured.

11. The image pickup apparatus according to claim 1, further comprising an approach detection unit configured to detect an object approaching the finder,
    wherein the control unit performs the control in such a manner that display of the first image on the display unit in the review display is started if the approach detection unit detects no object approaching the finder after the continuous shooting.

12. The image pickup apparatus according to claim 1, further comprising a shooting instruction unit configured to be able to make a shooting instruction,
    wherein the control unit performs the control in such a manner that display of the first image on the display unit in the review display is started when the instruction of the shooting instruction unit is released after the continuous shooting.

13. The image pickup apparatus according to claim 1, further comprising a shooting preparation instructing unit configured to be able to make a shooting preparation instruction,
    wherein the control unit performs the control in such a manner that display of the first image on the display unit in the review display is started when the instruction of the shooting preparation instruction unit is released after the continuous shooting.

14. The image pickup apparatus according to claim 1, wherein the control unit performs the control in such a manner that measurement of the display time for the first image in the review display is started after a lapse of a predetermined period after completion of the continuous shooting.

15. The image pickup apparatus according to claim 1, wherein the finder is an optical finder.

16. The image pickup apparatus according to claim 1, wherein a shooting mode is selectable from a continuous shooting mode for performing at least continuous shooting and a single shooting mode for performing shooting once in response to a shooting instruction regardless of a period of the shooting instruction, and
    when the continuous shooting mode is selected, the control is performed in such a manner that the display time for the first image is longer than the display time for the second image in a case where the plurality of images captured in the continuous shooting is sequentially displayed on the display unit as a review display after the continuous shooting is performed.

17. The image pickup apparatus according to claim 16, wherein the display time for the second image in the review display after the continuous shooting is shorter than a display time for an image in the review display after shooting in the single shooting mode.

18. The image pickup apparatus according to claim 1, wherein
the finder is an electronic viewfinder,
the image pickup apparatus further comprises an approach detection unit configured to detect an object approaching the finder, and
the control unit performs the control in such a manner that a display time for an image being displayed or an image to be subsequently displayed is extended when a detected state of the approach detection unit changes during the review display after the continuous shooting.

19. A control method of an image pickup apparatus including a finder unit configured to enable visual confirmation of an object image, and
a display unit located outside of the finder unit, the control method comprising:
controlling a display time for a first image acquired in a first shooting operation to be longer than a display time for a second image acquired in a second shooting operation in a case where a plurality of images is sequentially displayed on the display unit as a review display after continuous shooting is performed, the plurality of images being captured in the continuous shooting for continuously performing a plurality of shooting operations including at least the first shooting operation and the second shooting operation in response to a shooting instruction, the second shooting operation being performed after the first shooting operation.

20. A non-transitory computer-readable storage medium storing a program for executing a control method of an image pickup apparatus including a finder unit configured to enable visual confirmation of an object image, and a display unit located outside of the finder unit, the control method comprising:
controlling a display time for a first image acquired in a first shooting operation to be longer than a display time for a second image acquired in a second shooting operation in a case where a plurality of images is sequentially displayed on the display unit as a review display after continuous shooting is performed, the plurality of images being captured in the continuous shooting for continuously performing a plurality of shooting operations including at least the first shooting operation and the second shooting operation in response to a shooting instruction, the second shooting operation being performed after the first shooting operation.

* * * * *